United States Patent
Diez et al.

(10) Patent No.: US 8,990,415 B2
(45) Date of Patent: Mar. 24, 2015

(54) METHOD AND SYSTEM FOR AUTHENTICATING SERVERS IN A DISTRIBUTED APPLICATION ENVIRONMENT

(75) Inventors: Adrian Alvarez Diez, Boeblingen (DE); Frank Leo Mielke, Eutingen (DE)

(73) Assignee: International Business Machines Corporation, Armonk, NY (US)

(*) Notice: Subject to any disclaimer, the term of this patent is extended or adjusted under 35 U.S.C. 154(b) by 1495 days.

(21) Appl. No.: 10/562,488

(22) PCT Filed: Apr. 22, 2004

(86) PCT No.: PCT/EP2004/050589
§ 371 (c)(1),
(2), (4) Date: Dec. 22, 2005

(87) PCT Pub. No.: WO2004/114586
PCT Pub. Date: Dec. 29, 2004

(65) Prior Publication Data
US 2006/0161975 A1 Jul. 20, 2006

(30) Foreign Application Priority Data
Jun. 24, 2003 (EP) .................................... 03101858

(51) Int. Cl.
*G06F 12/14* (2006.01)
*H04L 29/06* (2006.01)
*H04L 29/08* (2006.01)

(52) U.S. Cl.
CPC ............ *H04L 63/0823* (2013.01); *H04L 63/12* (2013.01); *H04L 67/10* (2013.01)
USPC ....................................................... 709/229

(58) Field of Classification Search
CPC ..... G06F 21/33; H04L 9/3263; H04L 9/3268; H04L 63/0823
USPC ................ 709/229, 227, 228; 707/9; 713/173
See application file for complete search history.

(56) References Cited

U.S. PATENT DOCUMENTS

| | | | |
|---|---|---|---|
| 6,233,577 B1 * | 5/2001 | Ramasubramani et al. ...... 707/9 |
| 6,301,658 B1 * | 10/2001 | Koehler ......................... 713/155 |
| 6,367,009 B1 * | 4/2002 | Davis et al. .................... 713/166 |
| 2001/0049787 A1 * | 12/2001 | Morikawa et al. ............. 713/156 |
| 2002/0152382 A1 | 10/2002 | Xiao |
| 2003/0097592 A1 * | 5/2003 | Adusumilli .................... 713/201 |

FOREIGN PATENT DOCUMENTS

| | | |
|---|---|---|
| EP | 1132797 A2 | 9/2001 |
| JP | 06244832 A | 9/1994 |
| JP | 2003107994 A | 4/2003 |

* cited by examiner

*Primary Examiner* — Peter Shaw
(74) *Attorney, Agent, or Firm* — Grant A. Johnson (57) ABSTRACT

The present invention discloses a method and system for authenticating third tier servers in a distributed application environment by using a central procedure for recognizing and managing third tier server certificates at the client system side. Third tier server certificates which have been accepted by the central procedure are stored in a common database of the distributed application environment and the client system transmits via a secure connection to the server systems all necessary information of said third tier server certificates being accepted as trustworthy for determining to accept or to decline a third tier server. In a preferred embodiment of the present invention only fingerprints of third tier server certificates being accepted as trustworthy together with server name which has transmitted said third tier server certificate, and certificate name are transferred via a secure connection to the server systems of the distributed application environment.

18 Claims, 4 Drawing Sheets

METHOD AND SYSTEM FOR AUTHENTICATING SERVERS IN A DISTRIBUTED APPLICATION ENVIRONMENT

FIELD OF THE INVENTION

The present invention relates to authentication of servers in a distributed application environment, and in particular to authentication of third tier servers in a secure distributed application environment with non-continuous client-server connection.

BACKGROUND OF THE INVENTION

A distributed application environment typically consist of one or more client systems having parts of the distributed application, e.g. GUI components, processing components (client application), server systems system having the remaining parts of the distributed application (server application or server components), and a third tier server system which exchanges data between the client system and the server systems, e.g. provides a repository for the application data. For example SAP R/3 (trademark of SAP) is a typical example for a distributed application where the application is divided in a client part, e.g. running on a workstation like IBM Thinkpad, and a number of server parts, e.g. running on a IBM zSeries mainframe system.

The communication between the systems of the distributed application environment can take place in a secure or insecure communication environment. For example, a secure communication is normally given in the Intranet, and an insecure communication is given in the Internet. Distributed applications—particularly of those which handle sensitive information, such as operating system configuration data—demand that data interchange between the distributed components and with other applications such as databases should be protected by means of an established security mechanism.

A common way to protect the communication between client and server system is by establishing a secure session, where all communication is encrypted using a symmetrical key. This symmetrical key is exchanged between the partners using the public key cryptography. This exchange is typically combined with authentication of the partners.

The most prominent exponent of such security mechanisms is SSL (Secure Socket Layer) that represents "the most commonly-used protocol for managing the security of a message transmission on the Internet". Amongst other things, SSL uses so called 'server certificates' to check and assure the identity of the server part in a connection. The certificate is used to distribute the public key. In addition it contains owner's name, certificate name, expiration date, public key of the signer of the certificate as well as a digital signature being generated by the owner's private key applied to the certificate. The checking, acceptance and administration of such certificates in each component of a distributed application may be a problem if no direct user-interaction is possible, which is particularly the case in server components.

By using that protocol the user benefits from a high level of protection with few effort. To establish a secure connection, the security protocol exchanges client or server certificates during the connection handshake. A definition and the message flow of SSL handshakes for example can be found in RFC 2246. Certificates identify and authenticate the participating parties.

The recipient can verify a certificate in two different ways. The first way, if the certificate has been signed by another certificate and that the certificate has been trusted before by the recipient, the new certificate can be trusted automatically. Already trusted certificates are kept in a database for the verification process in following connection handshakes. The second way, if the recipient has no certificate in its database which confirms the incoming peer certificate as trustworthy, the user must decide whether to accept or reject the certificate. This can be done by comparing the results of hash functions applied to certificate information with securely published values. If the user chooses to reject the certificate, the connection will not be established.

PRIOR ART

Figure 1:
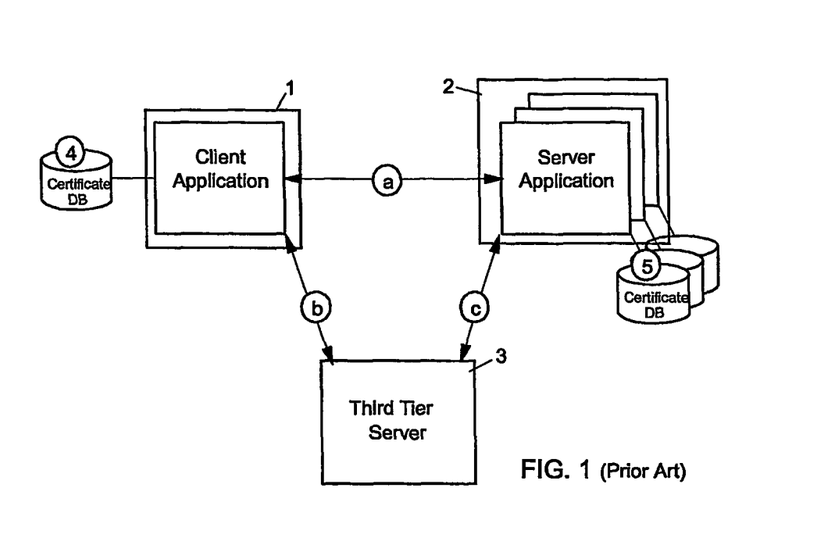
FIG. 1 shows a prior distributed application environment.

FIG. 1 shows a prior art distributed application environment which consists of a component 1 running on a client system and several components 2 running on a number of servers (n-number server system) that communicate via connection a. A user controls the client application 1 but there is, except in case of administration, no direct user interaction with the server components 2.

An example for the client system can be a Windows® workstation. The server application can for example run on an IBM zSeries mainframe system.

Both, client system and server system communicate with a third tier server system 3, e.g. a database or another kind of repository like an LDAP server, through the corresponding connections b and c. Both connections are used to transfer data from the client application 1 to the server application 2 and vice versa, i.e. the client application 1 writes information into the common database—the third tier server system 3—and the server system 2 retrieves information from the database. During the processing of the server application 2, the results of the processing are written to the database and can then be retrieved from the client application. Client system 1 and server system 2 use local certificate databases to verify incoming certificates from a third tier server 3.

The data flow between the components of the distributed application environment may be briefly summarized as follows. The client system 1 sends a request to establish a connection b to the third tier server system 3. During the connection handshake the third tier server 3 sends back a third tier server certificate to the client system that identifies the third tier server 3. Client system 1 uses the certificate database 4 to verify the third tier certificate. If this automatic verification fails, the user must manually reject or accept the certificate. This can be done with the help of a dialog. In the latter case the accepted certificate is stored in the certificate database 4. Client system 1 hands over program control to the server systems 2. The server systems 2 try to connect to the third tier server system 3. The server systems send a request to establish a connection c. During the connection handshake the third tier server 3 sends back a third tier server certificate to server system 2 that identifies the third tier server 3. Server systems 2 use the certificate database 5 to verify the third tier server. If this verification fails, a mechanism must be used to decide whether the certificate can be accepted. If the connection a to the client system 1 is permanent and secure, a possible solution consists in using the certificate database 4 or manual user interaction. Another way can be a set of policies on the server systems that determine the making of decisions.

DISADVANTAGES OF THE PRIOR ART

Each server application has a local certificate database which means additional effort to maintain and to protect the certificate data. If there are e.g. 100 server systems it is a tremendous effort to protect each certificate database against fraudulent modification. In addition multiple parameters must be known to the server system to access the certificate database, such as the location (file name) and a password or user name to access the database. These parameters can be different for each system and must be specified for each server application. If for some reason a certificate is no longer trustworthy, it may happen that all server certificate databases have to be modified manually to remove the obsolete certificate.

It will sometimes be necessary to have a user decide if an unknown certificate is trustworthy. This represents a problem, since the user does normally not interact directly with the server application. It cannot be taken for granted that a continuous, secure and tamper-proof connection to the client exists which can be used to send a verification request to the user. Client and server are not necessarily active simultaneously all the time. This is particularly true if the server application is a batch process that is started by the client. When the connection is discontinued after the server process is started, there is no easy way for the server application to initiate a secure connection to the client system. Using hard coded policies to decide if an unknown certificate can be accepted is not flexible enough and may be a security leak.

OBJECT OF THE INVENTION

Starting from this, the object of the present invention is to provide a method and system for authenticating servers in a distributed application environment avoiding the disadvantages of the prior art.

Brief Summary of the Invention

The present invention discloses a method and system for authenticating third tier servers in a distributed application environment by using a central procedure for recognizing and managing third tier server certificates at the client system side. Third tier server certificates which have been accepted by the central procedure are stored in a common database of the distributed application environment and the client system transmits via a secure connection to the server systems all necessary information of said third tier server certificates being accepted as trustworthy for determining to accept or to decline a connection to the third tier server. In a preferred embodiment of the present invention only fingerprints of third tier server certificates being accepted as trustworthy together with the server name which has transmitted said third tier server certificate, and the certificate name are transferred via a secure connection to the server systems of the distributed application environment.

BRIEF DESCRIPTION OF THE SEVERAL VIEWS OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

FIG. 2 A-C show the inventive system at the client system and the server systems side with the new concept of common certificate recognition and management in a distributed application environment.

Figure 2A:
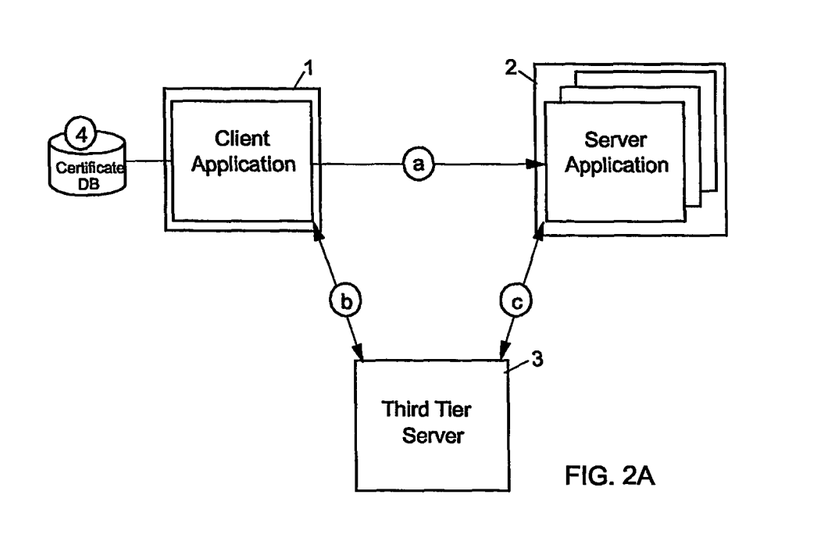
Figure 2B:
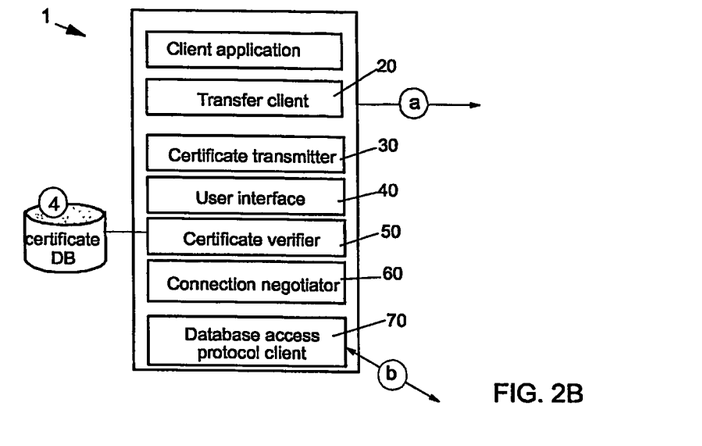
Figure 2C:
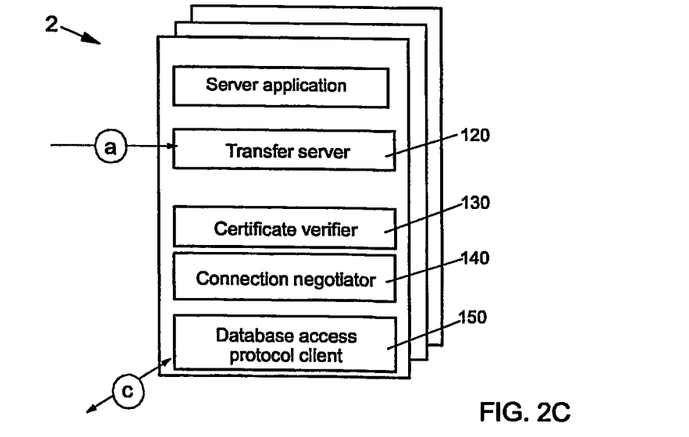

With reference to FIG. 2 A, there is depicted a system diagram with the inventive concept of common certificate management within the distributed application. The significant difference to the prior art is that no database for the certificates at the server side is needed anymore. Client system and server systems which support the inventive concept are illustrated in more detail in FIG. 2 B and FIG. 2 C.

With reference to FIG. 2 B, there are depicted client components of a client system supporting the inventive concept of common certificate management. The client component consists of a Data Access Protocol Client component 70, a Connection Negotiator component 60, a Certificate Verifier component, a User Interface component 40, a Certificate Transmitter component 30, and a Transfer Client component 20.

The inventive components of the client system are:

connection negotiator component 60 with the functionality to receive third tier server certificates from the third tier server via connection b.

certificate verifier component 50 with functionality to check a received third tier server certificate against certificate information stored in the common database 4 of the distributed application environment.

user interface component 40 with the functionality to ask an user whether an unknown third tier server certificate can be accepted.

Certificate transmitter component 30 with the functionality to extract certificate information of all trusted certificates from the common database 4 and transmits it to the server system via a connection a.

A common data base 4 of the distributed application environment that contains third tier server certificates received from said third tier server which have been accepted as trustworthy for the distributed application environment.

Following communication components are normally available in prior art client systems in order to establish communication with the server systems/and or third tier server system:

Database access protocol client component 70 with the functionality to communicate with the third party server. Possible used protocols are e.g. LDAP (Lightweight Directory Access Protocol) to connect to an LDAP-server or JDBC (Java Database Connectivity) to connect to a relational database.

Transfer Client component 20 with the functionality to communicate to the server systems. Examples are an SFTP-client implementation or an HTTPS-client implementation.

With reference to FIG. 2 C, there are depicted server components of the server systems supporting the inventive concept of common certificate management. The server component preferably consists of a Data Access Protocol Client component 150, a Connection Negotiator component 140, a Certificate Verifier component 130, and a Transfer Server component 120.

The inventive components of the server systems are following components:

Connection negotiator component 140 with the functionality to receive third tier server certificates from third tier server system.

Certificate verifier component 130 with the functionality to check a received certificate against certificate information received from the client system through connection a. This connection does not need to be sustained during the whole lifetime of the server.

Following communication components are normally available in prior art server systems in order to establish communication with client system or other third tier server systems:

Database access protocol client component 150 with the functionality to communicate with the third party server. Possible used protocols are e.g. LDAP (Lightweight Directory Access Protocol) to connect to an LDAP-server or JDBC (Java Database Connectivity) to connect to a relational database.

Transfer Server component 120 with the functionality to communicate to the client applications for the same protocol. Examples are a secure FTP-server implementation or an HTTPS-server implementation.

A preferred embodiment of the inventive concept of common certificate management according to FIG. 2 A-C is described now.

The client system 1 contains a certificate transmitter component 30 that calculates at least one fingerprint (fingerprint is preferably generated with a hash function applied to a certificate), preferably two different fingerprints (e.g. using SHA and MD5 algorithms) for every certificate stored in the common database of the distributed application environment (however it should be noted that the generation of fingerprints is not an essential feature for carrying out the present invention; the present invention is also applicable by sending the whole third party certificate to the server component). This information is sent to the server systems 2 together with certificate name and hostname of the third tier server system from which the certificate has been received. This is all information necessary to verify that a certificate was accepted by the client component. It requires that the client system has built up a successful connection to the third tier server before any of the server system in the distributed application. This can usually be assumed in most distributed applications. All certificates that have been accepted by the client system 1 will also be accepted by all server systems 2.

For example when client system and server systems communicate via Internet the connection between client system and server system must be secure in order to avoid tampering of the certificate information sent by the client system. The concept preferably relies on a standard transmission protocol (e.g. FTP) that is usually available on every server system. In an environment where security is vital the secure flavor of the protocol (e.g. Secure FTP) should be available by default. No additional effort needs to be spent to establish a secure connection to the server system.

From the perspective of certificate management the information flow of the connection only needs to be unidirectional. There is no necessity for the server systems to send feedback information to the client system to accept or reject certificates.

The connection a between client and server system does not need to be sustained during the complete lifetime of the server component process. A short timeframe is sufficient to transmit the necessary certificate data from client to server.

Each server of the server system 2 uses the certificate information sent by the client system to verify a connection to a third tier server 3. Fingerprints of incoming third tier server certificates are compared against the set of certificate data received from the client system to decide if certificate and thereby also the connection c is acceptable. The certificate name and the hostname of the third party server derived from the third party certificate is compared with the corresponding certificate information that has been received from the client component. The certificate is only verified if all attributes—both fingerprints, certificate name and hostname—match. This technique complies with the way a user would manually verify a certificate. Therefore the high security level is maintained.

No local certificate database exists on the server systems 2. Certificate verification is processed exclusively by means of the certificate information sent by the client system. There is no need to administer any third tier certificates locally on the server systems. This represents a major enhancement compared to the prior art.

The client system is acting as single point of control in the security infrastructure of the distributed application. It is the only application that needs security specific administration effort.

In the preferred embodiment of the present invention following attributes must be known to the certificate verifier component of the server system:
Certificate name,
two different fingerprints (e.g. generated with the SHA and MD5 algorithms), and
server name from which the certificate has been received.

It is necessary to generate two different fingerprints to assure the integrity of the certificate information. It is practically impossible to create a fake certificate that has the same two fingerprints as another certificate. The hostname is necessary to avoid that a wrong third party server reuses a valid certificate belonging to a trusted server. The hostname can be different to the hostname referenced in the certificate name if the client accepts differing values.

In an alternative embodiment of the present invention a whole third party certificate including name of the third tier server that has transmitted that certificate is transferred to server system. However, that alternative procedure causes more storage on the server system and provides less security compared with the fingerprints procedure.

In a further embodiment of the present invention only one fingerprint is generated and is sent, together name of server which has transmitted the third tier certificate, to the server system. It will provide less security compared with the two-fingerprints procedure.

An example of transmitted attributes derived from a third tier server certificate including certificate name, two different fingerprints, and name of the server which provided the third party certificate:
Certificate name: "cn=Pollux1065.de.ibm.com, ou=dev, o=IBM, c=DE"
SHA fingerprint: f4:e2:54:0c:9a:2a:5f:94:1d:c0:60:03:e4:b0:
fingerprint: e4:25:12:08:6a:ab:10:83:1e:7c:ed:c4:36:8f:
Server name: Castor1065.de.ibm.com With respect to FIG. 3, there is depicted a data flow between client system, third tier server system, and server systems according to FIG. 2 A-C.

Figure 3:
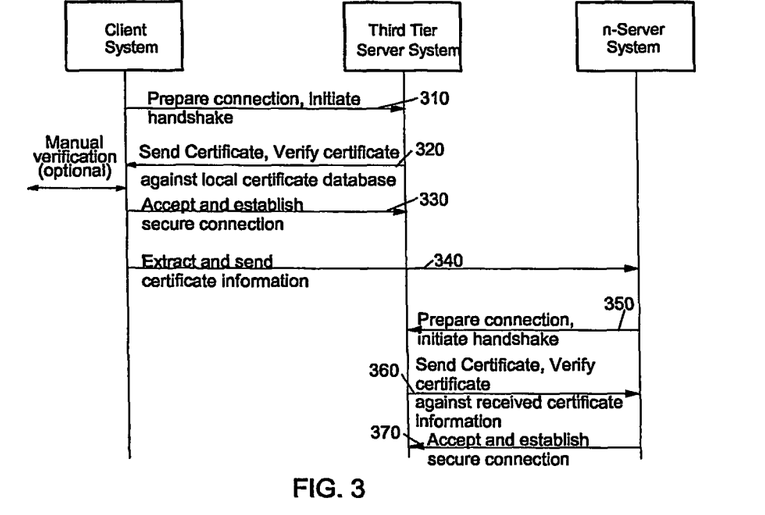
FIG. 3 shows inventive data flow between client, server, and third tier server using the inventive concept of common certificate recognition and management in a distributed application environment.

The client system establishes a secure connection with a third tier server system 310. The third tier server system transmits its certificate to the client system 320. The client system checks the received third tier server certificate against certificate information stored in the common database of the distributed application environment 320. If the third tier certificate matches with information stored in said common data base the certificate is accepted as trustworthy and a secure connection to the third tier server can be established 330. The client system contains a certificate transmitter component 30 that calculates at least one fingerprint, preferably two different fingerprints (e.g. using SHA and MD5 algorithms) for every certificate stored in the common database of the distributed application environment and sends these fingerprints together with certificate name and hostname of the third tier server from which the certificate has been received to the server systems 340. The certificate information is preferably sent to the server systems during each invocation of the server applications. Furthermore, connection between client system and server systems is preferably a secure and non-continuous client-server connection. The server systems prepare connection with the third tier server by initiating handshake 350. The third tier server sends its certificate to the server systems and the server systems compare the certificate information with the information received from the client system 360. The server systems having access to two different algorithms applied to generate the two different fingerprints at the client system calculates with each algorithm a fingerprint of the certificate received from the third tier server. If the fingerprints match with the fingerprints received from the client system, the third tier server is accepted and a secure connection can be established 370.

Figure 4:
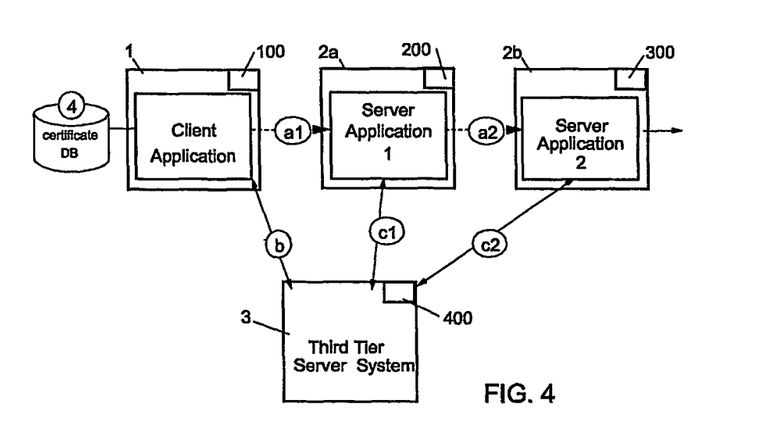
FIG. 4 shows a specific embodiment of the present invention using the inventive concept of certificate recognition and management in a workflow environment of a distributed application environment.

With respect to FIG. 4, there is depicted a specific embodiment of the present invention using the inventive concept of certificate recognition and management in a workflow environment.

In a scenario where information flow is organized in cascades of invocations the new concept can be used to protect the data streams from every server to the third party server and between the servers themselves.

The first part of the data flow is identical to the described scenario previously. In a workflow process the server system 2a can act as secure connection initiator in a subsequent secure connection a2 to another server system 2b. Each server system must be extended with an additional "Certificate transmitter"-module and a "Transfer client"-module that are identical to the modules used initially in the client system.

In order to initiate the cascade of secure connections between the server systems, the client system 1 must not only transmit the certificate information associated to the third tier server (400) but also certificate information (300) of all servers in the calling chain. Each server must hand over this certificate information set to the server it invokes.

With this procedure it is assured that all connections between the servers as well as between the servers and third tier servers 3 are secured with verified certificates.

Again, the client system 1 is the single point of control in the security infrastructure of the distributed workflow application.

Figure 5:
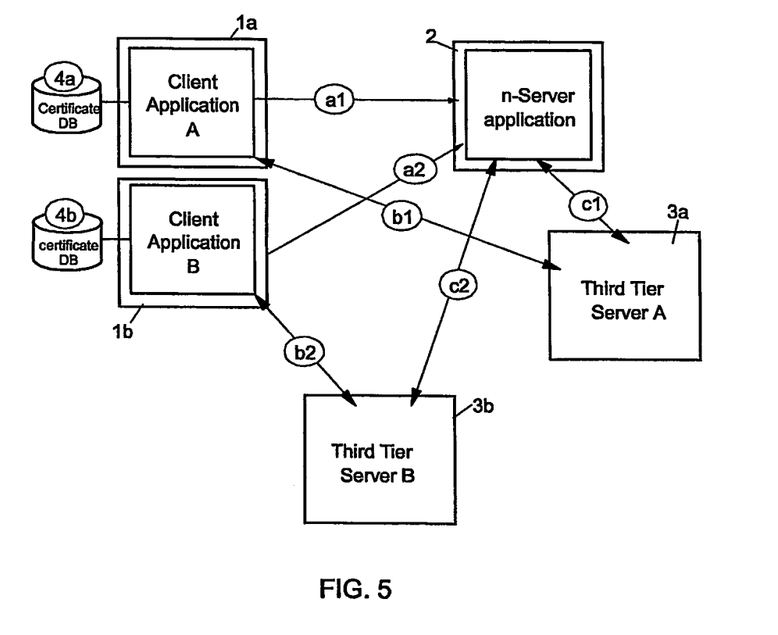
FIG. 5 shows another specific embodiment of the present invention using the inventive concept of certificate recognition and management in a distributed application environment with logical association between client system and third tier server system.

With respect to FIG. 5, there is depicted specific embodiment of the present invention using the inventive concept of certificate management in an environment with logical association between client system and third tier server.

The scenario emphasizes the possibility to tailor the certificate information to the actual needs of the concerned client. In this case every client system is associated to an individual third tier server. All client systems communicate with the same server systems on an identical server system, but each client system requires that server systems to interact with a different third tier server.

As an example the client system 1a will deposit data on the third tier server 3a and needs that the server system 2 connects to that repository. When invoking the server systems through the connection a1, the client system will transmit the certificate information associated to the third tier server 3a to assure that 2 can securely connect to 3a through connection c1.

In contrast, the client system 1b deposits its data in the third tier server 3b. Client system 1b transmits to the server systems 2 the certificate information associated to the third tier server 3b via connection a2. Hereby the client system assures that server systems 2 can securely connect to third tier 3b through connection c2.

The invention claimed is:

1. Method for authenticating a third tier server system in a distributed application environment, wherein said distributed application environment comprises a client system having parts of the distributed application, one or more server systems having the remaining parts of the distributed application, and a third tier server system which exchanges data between said client system and said server system, wherein said client system acts as single point of recognizing and managing third tier server certificates and provides access to a common data base of the distributed application environment which contains third tier server certificates received from said third tier server which have been accepted as trustworthy for the distributed application environment, wherein at said server system said method comprises:

receiving certificate data from said client system via a secure connection, wherein said certificate data contains at least all necessary information to establish that said client system has previously accepted a third tier server certificate as trustworthy for determining to accept or to decline a connection to said third tier server system, receiving a copy of said third tier certificate from said third tier server system, comparing said certificate data received from said client system with said copy of said third tier certificate received from said third tier server system, accepting said third tier server system as authenticated by said server system if said certificate data from said client system and said copy of said third tier certificate matches, and in response, establishing a connection with said third tier server system, wherein said server system automatically accepts all certificates that have been accepted by the client system.

2. Method according to claim 1, wherein said certificate data from said client system is received via a non-continuous client-server connection.

3. Method according to claim 2, wherein said non-continuous client- server connection is using a secure transmission protocol.

4. Method according to claim 1, wherein said necessary information of said third tier server certificate consist of an original third tier server certificate as stored in the common data base of said distributed application environment, and a name of the third tier server system which has transmitted said original third tier server certificate to said client system.

5. Method according to claim 1, wherein said necessary information of said third tier server certificate consist of a fingerprint of the original third tier certificate, and a name of the third tier server system which has transmitted said third tier server certificate to said client system.

6. Method according to claim 1, wherein said necessary information of said third tier server certificate consists of two different fingerprints of the original third tier server certificate, a name of the third tier server system which has transmitted said third original tier server certificate to said client system, and a certificate name.

7. Method according to claim 1, wherein validation of the copy of said third tier certificate is processed at the server system exclusively using said certificate data received from said client system.

8. Method according to claim 7, wherein said certificate data is stored in a common data base managed by said client system.

9. Method according to claim 1, further comprising at said server system:
   initiating a secure connection to a second server system; and
   transmitting said certificate data received from said client system to said second server system.

10. Method for authenticating a third tier server system in a distributed application environment, wherein said distributed application environment comprises a client system having parts of the distributed application, one or more server systems having the remaining parts of the distributed application and a third tier server system which exchanges data between said client system and said server systems, wherein said client system provides access to a common data base of the distributed application environment which contains third tier server certificates received from said third tier server which have been accepted as trustworthy for the distributed application environment, wherein at said client system said method comprises:
   receiving a third tier server certificate from said third tier server system,
   determining whether to accept said received third tier server certificate as trustworthy,
   storing said third tier server certificate in said common data base of the distributed application environment if said third tier server certificate has been accepted as trustworthy,
   transferring to each server of said server systems via a secure connection all necessary information of said third tier server certificates being accepted as trustworthy by the client system for determining at the server system whether to establish a connection at the server system with said third tier server system for use by the distributed application, wherein said server system automatically accepts all certificates that have been accepted by the client system.

11. Method according to claim 10, wherein said storing includes storing a name of said third tier server system that has transmitted said third tier certificate.

12. Method according to claim 10, wherein said third tier server certificate is received via a secure transmission protocol.

13. Method according to claim 10, wherein said necessary information of said third tier server certificate is transmitted to said each server of said server systems via a non-continuous secure connection.

14. Method according to claim 11, wherein authentication of said client system is accomplished by user ID and/or password.

15. Method according to claim 10, wherein said all necessary information comprises a name of said third tier server system that has transmitted said third tier certificate to said client system and a fingerprint of the accepted third tier certificate.

16. Method according to claim 14, further comprising prompting a user of the client system to accept or deny the received third tier certificate.

17. A computer program product comprising a non-transitory computer useable medium including a computer readable program, wherein the computer readable program when executed on a computer system causes the computer system to implement a method for authenticating a third tier server system in a distributed application environment, wherein said distributed application environment comprises a client system having parts of the distributed application, one or more server systems having the remaining parts of the distributed application and a third tier server system which exchanges data between said client system and said server systems, wherein said client system provides access to a common data base of the distributed application environment which contains third tier server certificates received from said third tier server which have been accepted as trustworthy for the distributed application environment, wherein at said client system said method comprises:
   receiving a third tier server certificate from said third tier server system,
   determining whether to accept said received third tier server certificate as trustworthy,
   storing said third tier server certificate in said common data base of the distributed application environment if said third tier server certificate has been accepted as trustworthy,
   transferring to each server of said server systems via a secure connection all necessary information of said third tier server certificates being accepted as trustworthy by the client system for determining at the server system whether to establish a connection at the server system with said third tier server system for use by the distributed application, wherein said server system automatically accepts all certificates that have been accepted by the client system.

18. Computer program product comprising a non-transitory computer useable medium including a computer readable program, wherein the computer readable program when executed on a computer system causes the computer system to implement a method for authenticating a third tier server system in a distributed application environment, wherein said distributed application environment comprises a client system having parts of the distributed application, one or more server systems having the remaining parts of the distributed application and third tier server system which exchanges data between said client system and said server system, wherein said client system acts as single point of recognizing and managing third tier server certificates and provides access to a common data base of the distributed application environment which contains third tier server certificates received from said third tier server which have been accepted as trustworthy for the distributed application environment, wherein at said server system said method comprises:
   receiving certificate data from said client system via a secure connection, wherein said certificate data contains at least all necessary information to establish that said client system has previously accepted a third tier server certificate as trustworthy for determining to accept or to decline a connection to said third tier server system,
   receiving a copy of said third tier certificate from said third tier server system,
   comparing said certificate data received from said client system with said copy of said third tier certificate received from said third tier server system, accepting said third tier server system as authenticated by said server system if said certificate data from said client system and said copy of said third tier certificate matches, and in response, establishing a connection with said third tier server system, wherein said server system automatically accepts all certificates that have been accepted by the client system.

* * * * *